United States Patent Office 3,584,106
Patented June 8, 1971

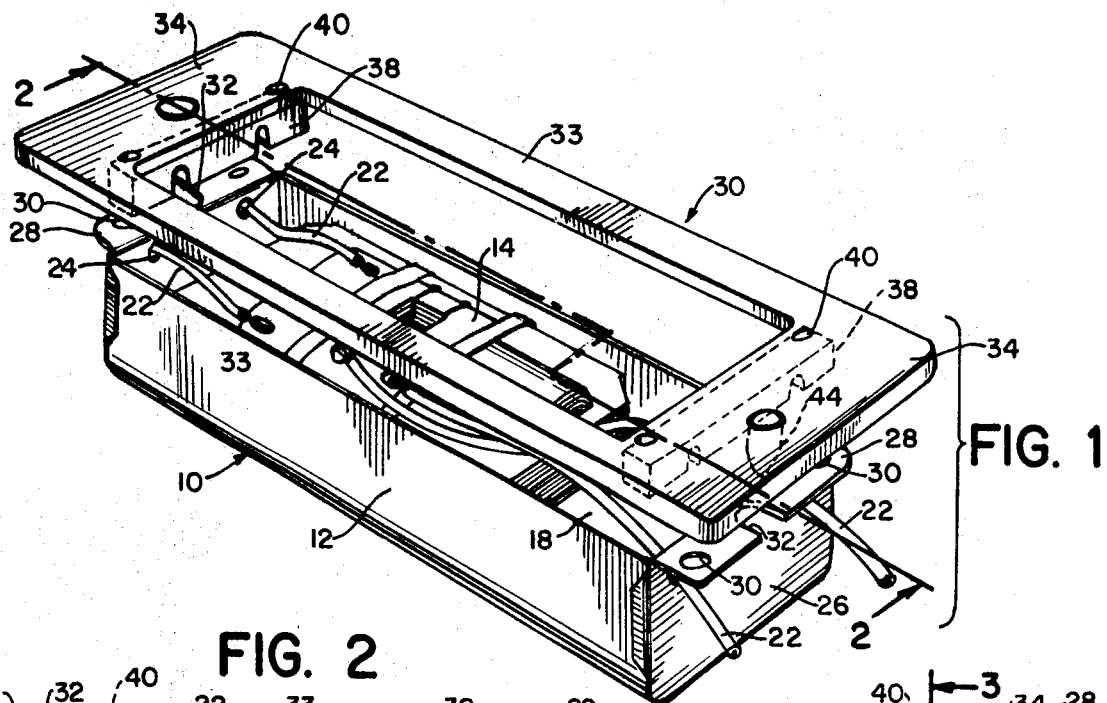
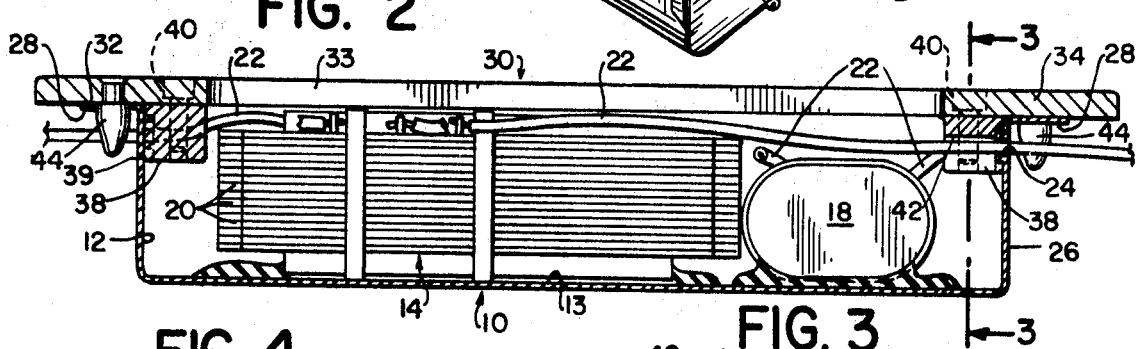
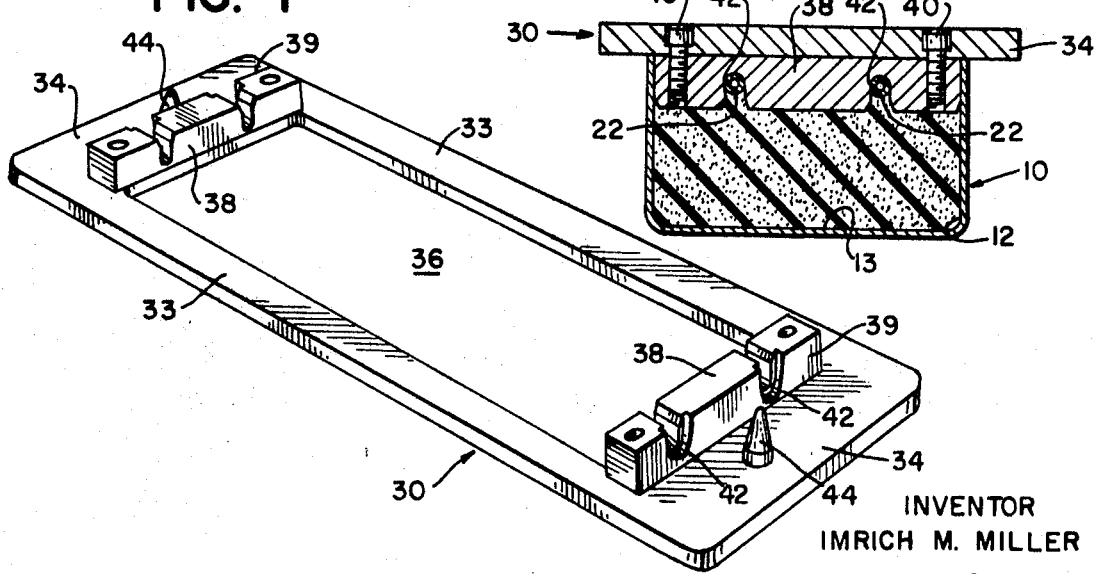
INVENTOR
IMRICH M. MILLER
BY Darby & Darby
ATTORNEYS

3,584,106
METHOD FOR POTTING ELECTRICAL DEVICES
Imrich M. Miller, Passaic, N.J., assignor to Universal Manufacturing Corporation, Paterson, N.J.
Continuation of abandoned application Ser. No. 598,873, Dec. 2, 1966. This application Aug. 11, 1969, Ser. No. 850,337
Int. Cl. B29d 3/00
U.S. Cl. 264—262                    2 Claims

ABSTRACT OF THE DISCLOSURE

Method for potting electrical devices in which a frame having an opening and a three-dimensional spacer is placed on an open portion of the housing. The three-dimensional spacer extends into said housing and hot potting compound is poured into the housing through the frame opening. Upon cooling of the potting compound the frame is removed leaving a void where the spacer was located into which the potting compound can expand upon subsequent heating. An insulated lead wire of the electrical device passes out through a housing wall adjacent which the spacer is located. The spacer covers a portion of the lead wire to prevent the hot potting compound from coming into direct contact with it.

---

This is a continuation of application Ser. No. 598,873, filed Dec. 2, 1966, now abandoned.

This invention relates to the manufacture of electrical devices and more particularly to a novel method for potting electrical components such as transformers.

In the final assembly of electrical components such as transformers, the component housing is often filled with a hot potting compound of insulating material which for example may be a plastic or asphaltic compound. The hot potting compound is poured into the housing and the housing is then usually sealed off by a cover. The potting compound then cools to form a solid mass which protects the electrical component.

In potting some types of components, for example ballast transformers for fluorescent lamps, pouring the correct amount of potting compound into the housing presents somewhat of a problem. When too much potting compound is put into the housing, heating of the transformer causes the compound to expand an amount sufficient to buckle the cover member. When this occurs the hot potting compound can leak out causing a safety hazard as well as adversely affecting the operation of the potted electrical device and its associated operating components, such as the fluorescent lamps. Such results are of course undesirable.

Another problem arises when potting electrical devices having lead wires with a plastic insulation, such as a polyvinyl chloride plastic. Here, the hot potting compound poured into the housing softens the insulation on the wire. This gives rise to the possibility that the insulation can be moved away and an electrical short circuit can occur.

The present invention relates to a novel method for potting electrical devices and particularly inductive devices such as transformers. In accordance with the invention a protective plate is placed on the component housing into which the potting compound is to be poured. The plate serves as a guide for filling the housing with the proper amount of the potting compound. Also in accordance with a preferred embodiment of the invention, the plate has one or more spacers which are utilized to control the amount of potting compound poured into the housing by providing void areas into which the compound in the housing can expand when the electrical device is in operation and heats the compound. These voids afford a desirable safety feature in preventing the compound from buckling the housing cover and leaking out. They also serve as reservoirs and prevent buckling of the cover or housing since they can accommodate potting material when excess potting compound is poured into the housing. The preferred embodiment of the invention also provides an arrangement for protecting the insulation of portions of the lead wires of the device from the hot potting compound as it is poured into the housing.

It is therefore an object of the present invention to provide a novel method for potting electrical devices.

A further object is to provide a protective plate for use in potting a transformer, the plate having one or more spacers to provide expansion control areas in the housing for the potting compound.

Still another object is to provide a means for protecting a portion of the insulation of the lead wires of an electrical device when the device housing is being filled with a hot potting compound.

Yet a further object is to provide a novel electrical transformer in which the potting compound is placed therein in a controlled amount.

An additional object is to provide a method of potting an electrical device by controlling the amount of potting compound poured into the device housing by the use of a guide plate.

Other objects and advantages of the present invention will become more apparent upon reference to the following specification and annexed drawings in which:

FIG. 1 is a perspective view of a fluorescent lamp ballast transformer and the protective plate in position for assembly to the transformer housing;

FIG. 2 is a side elevational view taken in section along lines 2—2 of FIG. 1, of the protective plate assembled onto the transformer housing;

FIG. 3 is an elevational view of the end of the housing of plate of FIG. 2 taken along lines 3—3 of FIG. 2; and FIG. 4 is a perspective view of the bottom of the protective plate.

Referring to the various figures of the drawings the novel method and apparatus of the present invention is shown used with a fluorescent lamp ballast transformer 10 which has a housing 12 of generally rectangular configuration. The housing is usually made of metal. A transformer 14 is held to the bottom wall 13 of the housing 12 by a few "spots" of a suitable adhesive material, for example, such as potting compound. A capacitor 18 is located next to the transformer and is also held to the bottom of the housing in the same manner. The transformer 14 is shown as being of the shell type with a plurality of laminations 20 stacked one atop another. Of course, any suitable transformer configuration or any other type of electrical device may be utilized with the present invention.

Both the transformer 14 and the capacitor 18 have a plurality of lead wires 22 connected thereto. The lead wires 22 which are to be connected to components and/or a power source external to housing 12 are brought out through respective holes 24 formed in the end walls 26 of the housing. The lead wires 22 are insulated, for example, with a suitable plastic insulating material such as polyvinyl chloride plastic.

A flange 28 is formed on each end wall 26 of the housing. Each flange is formed with a pair of mounting holes 30 and a mounting slot 32.

After the transformer 14, capacitor 18 and other components (if used) are placed within the housing 12, the housing is filled with a potting compound of any suitable electrical insulating material for example one of plastic composition or of the asphaltic type. The potting compound is preferably filled to a level to compeltely cover both the transformer 14 and the capacitor 18 and all other components.

As should be apparent, pouring the potting compound directly into the housing without using any control means is somewhat unsatisfactory. First of all, it is difficult to accurately control the amount of potting compound poured into the housing. Secondly, spaces or voids cannot be provided in the housing to permit the expansion of the potting compound when the ballast transformer overheats. Additionally, pouring hot potting compound into the housing can melt or soften the insulation on the lead wires 22. When this happens the portions of the side walls 26 surrounding the holes 24 can easily cut through or push back the softened insulating material and cause a short circuit or decrease the thickness of the insulation to an unacceptable degree.

In accordance with the present invention the aforesaid problems are overcome by the use of a protective plate 30 which is used during the final assembly of the ballast transformer. Plate 30 is made of any suitable material preferably a smooth polished metal. As shown most clearly in FIGS. 1 and 4 the protective plate 30 is of generally rectangular shape with a pair of elongated opposing side legs 33 and a pair of opposing bridging end members 34 forming an opening 36. The size of the plate opening 36 generally corresponds to the size of the opening formed between the side and end walls of the housing 12.

A spacer member 38 is located on each side wall of the plate 30 and is held thereto by a pair of screws or other suitable fasteners 40. Of course, the spacers and frame can be cast or machined as an integral unit. The thickness of each spacer, that is, its dimension in the direction along the length of the elongated side legs 33, and its width and height are selected to provide a predetermined expansion volume in the housing. The outer side wall 39 of each spacer is preferably located to abut or lie closely adjacent the inside of each end wall 26 of the ballast housing for reasons described in greater detail below. Each spacer 38 is also formed with one or more grooves 42 whose purpose also is described below.

A locating lug 44 is also provided on each of the end members 34 of the protective plate. These lugs are used to align the plate on the housing and hold it thereto.

As shown most clearly in FIGS. 1 and 2, the plate 30 is assembled to the open top of housing 12 by inserting the spacer members 38 within the housing and pressing the locating lugs 44 into the mounting slots 32 on the housing flanges 28. It should be clear that a different size protective plate has to be provided for each size housing. The side legs 33 of the plate lie on the edges of the side wall of the housing 12 and preferably extend over into the housing opening for a short distance. Thus, the bottom surface of the side legs 33 form a measuring level to determine the upper limit of the fill of the potting compound.

As shown in FIG. 3, when the cover plate is placed onto the housing 12 the lead wires 22 are moved into the grooves 42. The edges of the grooves are preferably bevelled to aid in accomplishing this and each groove 42 is made of such a size so that one or more lead wires 22 can be accommodated therein. The insulation of each of lead wires lying in a groove is protected from the hot potting compound by the corresponding spacer member 38. The lead wires are also constrained from moving as the potting compound is being poured since they are held relatively tightly by the walls of the spacer members surrounding the grooves. When the spacer members abut or lie closely adjacent the end walls 26 of the housing the lead wire insultaion is protected at points where the wires are most susceptible of being short circuited, namely, at the holes 24 in the housing end walls 26 which usually have very sharp edges.

In final assembly and potting of the ballast transformer, the protective plate 30 is usually supplied cold from a refrigerated apparatus so that the potting compound will not stick to it. After the cold protective plate is mounted on the housing the hot potting compound is poured into the housing 12 through the opening 36 in the protective plate until it reaches the bottom surface of the plate's side legs 33 which extend over the top edges of the housing side walls. At the same time the spacers 38 provide expansion control areas or voids adjacent the side walls of the housing into which no potting compound can flow. When the potting compound cools and plate 30 is removed, these voids are available for expansion of the potting compound when the electrical device is being operated.

As also can be seen in FIG. 3, the lead wires 22 are protected from the potting compound at a point adjacent the housing end walls. Thus, they cannot be heated so that their insulation can soften or melt.

As explained above, the voids formed by the spacers serve as reservoirs into which the potting compound can expand when the ballast is in operation. This, of course, is a highly desirable feature since it prevents the housing and/or cover plate (not shown) from buckling with the resultant leakage of hot potting compound from the housing.

The voids also provide an additional advantage during assembly of the transformer. As frequently happens, an excess amount of potting compound is poured into the housing during assembly. When this occurs and the cover plate is forced on the housing with the compound still in a fluid or semi-fluid state, either the cover plate or the housing buckles meaning that the ballast must be rejected from the assembly line. The voids remedy this manufacturing problem since they accept the surplus compound which is pushed into it when the cover is put on the cam. This prevents the cover or housing from buckling. Also, since the plate and the air space in the void cools the potting compound in the immediate vicinity of the voids formed by spacers 38, the lead wires are not brought into contact with potting compound at a temperature which will melt their insulation.

While a preferred embodiment of the invention has been described above, it will be understood that it is illustrative only, and the invention is to be limited solely by the appended claims.

What is claimed is:

1. The method of applying potting material into a housing having a bottom and side walls forming a container having an open top for housing an electrical device within the container which device has at least one insulated lead wire comprising the steps of forming an opening in one of the container walls, passing said lead wire through said opening, locating a guide member having a three-dimensional spacer adjacent the top of said container with said spacer extending into the container, locating said spacer adjacent said one wall having said opening to cover a portion of said lead wire, applying hot potting compound into said container through said open top into the area adjacent to said spacer, the hot potting compound prevented from coming into direct contact with the portion of the lead wire covered by the spacer, and removing the guide member from the container after the potting compound has cooled to a substantially non-flowable state to leave a void in the container where the spacer was previously located into which the potting compound can expand upon subsequent heating thereof.

2. The method of claim 1 wherein said guide member is placed resting on the top of the walls defining the periphery of the open top of the container and said potting compound is poured into the container through its open top to a level which is substantially that of the bottom face of the guide member.

References Cited

UNITED STATES PATENTS

| | | | |
|---|---|---|---|
| 1,650,833 | 11/1927 | Healy | 264—277X |
| 2,286,090 | 6/1942 | Harrison | 264—278X |
| 2,544,430 | 3/1951 | McCutchan | 264—275X |
| 3,141,049 | 7/1964 | Parsons | 264—272X |
| 3,305,614 | 2/1967 | Parsons | 264—272X |
| 3,330,004 | 7/1967 | Cloyd | 264—278X |
| 3,084,391 | 4/1963 | Parstorfer | 264—272X |

ROBERT F. WHITE, Primary Examiner

A. M. SOKAL, Assistant Examiner

U.S. Cl. X.R.

264—263, 264, 272, 278; 249—91, 97